Sept. 20, 1955  J. W. WATSON  2,718,391
LEAF SPRING SPACING STRUCTURES AND ANCHORAGES THEREFOR
Filed April 14, 1950
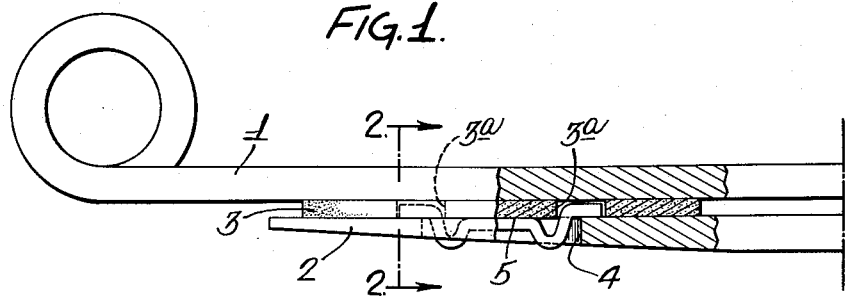
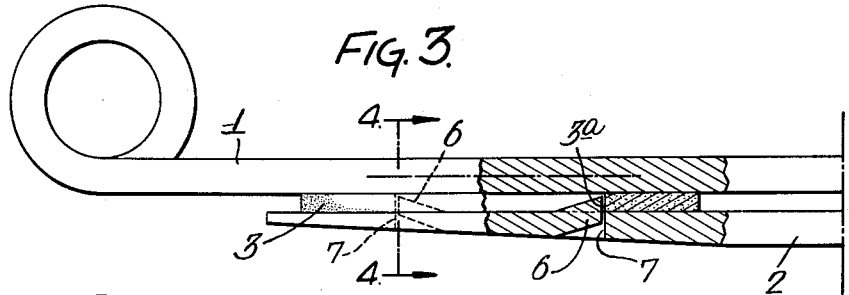
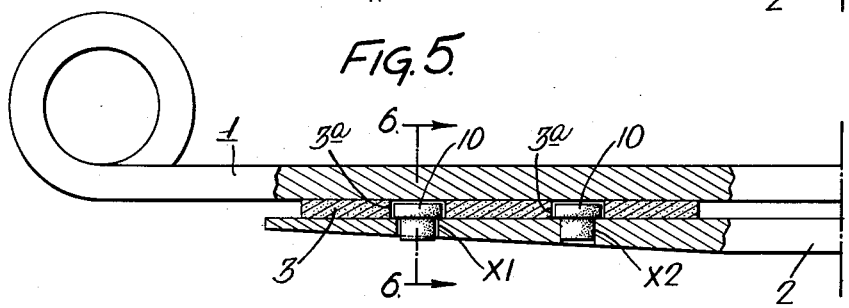
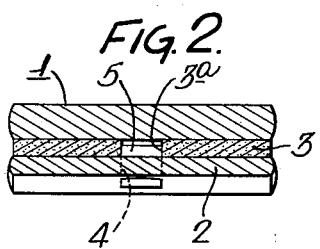
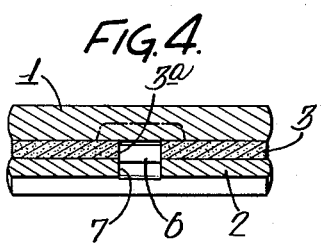
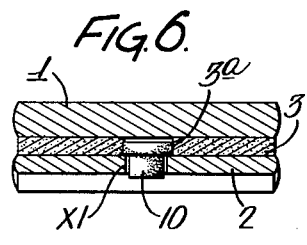
Inventor:
John Warren Watson
by his Attorneys
Howson & Howson

United States Patent Office 2,718,391
Patented Sept. 20, 1955

2,718,391

LEAF SPRING SPACING STRUCTURES AND ANCHORAGES THEREFOR

John Warren Watson, Wayne, Pa.

Application April 14, 1950, Serial No. 155,911

6 Claims. (Cl. 267—49)

This invention relates to means for holding a friction bearing structure in predetermined position between two frictionally opposed and relatively reciprocating bodies and in particular to means for holding a leaf-end friction bearing structure in predetermined position between and adjacent the ends of two opposed leaves of a leaf spring.

A particular object of my invention is to provide positive means for maintaining a bearing structure, while in service, in predetermined set position with relation to an end of one of two adjacent leaves of a leaf spring and very particularly in a manner to limit longitudinal, lateral and turning movements of the bearing structure with relation to that one leaf.

A further particular object of my invention is to provide anchoring means such as will permit the friction bearing structure to come into direct contact with a surface of each of said leaves and thus act to directly space them.

A further object of my invention is to provide anchoring means as above which is relatively inexpensive and which is well adapted to mass production.

A further particular object of my invention is to provide anchoring means carried by one of said leaves adjacent an end thereof and associated with the bearing structure in a manner to permit, upon the spreading of the leaves, the free removal of said bearing structure and its replacement in kind.

A further particular object of my invention is to provide a leaf-end friction bearing structure presenting to at least one of said leaves a surface of sufficient yieldability to readily conform, under pressures imposed in service, to irregularities thereof and thus form an automatic seal against the entry of grit and abrasive-laden waters.

A further particular object of my invention is to provide a leaf-end friction bearing structure exhibiting frictional properties whereof the static and dynamic coefficients of friction are sufficiently in balance to avoid setting up destructive spasmodic actions and/or objectionable noise-producing vibrations.

Other objects and advantages of the invention will be made apparent from the following description in connection with the accompanying drawings, in which:

Figure 1 is a fragmentary elevational view, partly in section, showing two adjacent leaves of a leaf spring, a leaf-end friction bearing structure spacing said leaves and an elongated anchor member wholly carried by one of said leaves and penetratively engaging an elongated hole provided in said one leaf adjacent an end thereof and penetratively engaging two through holes provided in the bearing structure in a manner to limit longitudinal, lateral and turning movements of said bearing structure with relation to said one leaf;

Figure 2 is a cross sectional view on line 2—2, Fig. 1;

Fig. 3 is a fragmentary elevational view, partly in section, showing two adjacent leaves of a leaf spring, a leaf-end friction bearing structure spacing said leaves and an anchoring device comprising two relatively spaced elements formed from the material of one of said leaves adjacent an end thereof and each penetratively engaging a through hole provided in the bearing structure in a manner to limit longitudinal, lateral and turning movements of said bearing structure with relation to said one leaf;

Figure 4 is a cross sectional view on line 4—4, Fig. 3;

Figure 5 is a fragmentary elevational view, partly in section, showing two adjacent leaves of a leaf spring, a leaf-end friction bearing structure spacing said leaves and two relatively spaced stud-like anchor members each wholly carried by one of said leaves and penetratively engaging a hole provided in said one leaf adjacent an end thereof and each penetratively engaging a through hole provided in said bearing structure in a manner to limit longitudinal, lateral and turning movements of said bearing structure with relation to said one leaf; and Figure 6 is a cross sectional view on line 6—6, Fig. 5.

Referring to the above illustrated examples of my invention it will be noted that the anchoring means in each instance is wholly carried by one of the two leaves and is in predetermined set position adjacent an end thereof and projects from a surface of said leaf and is in deep penetrative engagement with through hole means provided in the friction bearing structure and that the friction bearing structure is held in direct contact with both of the leaves and is therefore acting to space them.

Referring to Fig. 1, numeral 1 indicates one of two adjacent leaves of a leaf spring, 2 indicates the other of said two leaves, 3 indicates a leaf-end friction bearing structure, 3a indicates a through hole provided in the friction bearing structure, 4 indicates an elongated hole provided adjacent an end of leaf 2, 5 indicates an anchor member the end portions of which rest directly against the upper surface of leaf 2 and are firmly held in that position by pressure from the portion of bearing structure 3 which lies between the two holes 3a—3a in said structure. It will be noted that the lower portion of member 5 which penetratively engages the elongated hole 4 is made of generous depth in order to facilitate the positioning of this member in the hole 4 and to securely maintain its position therewithin while the bearing structure is placed thereon during the assembly of the leaves and which assembly is generally performed with the leaves resting on their edges. The ends of these end portions may be cut square but I prefer a somewhat rounded end or at least rounded or well tumbled corners to prevent cutting of the sides of hole 3a in the event it is desired to have the bearing structure 3 float between the leaves 1 and 2 as provided for in my copending application of April 25, 1947, Serial No. 743,997, now Patent 2,621,922, issued December 16, 1952, and wherein a lost motion is provided for in order that the movements and wear against the bearing structure be allowed to take place against both surfaces thereof instead of being held fast with relation to leaf 2 as is here illustrated and which results in all movements and wear taking place between the bearing structure and leaf 1. To accomplish this float, the holes 3a would each be made approximately one-eighth of an inch longer by adding one-sixteenth of an inch to each end of each hole. This would permit the bearing structure 3 to travel back and forth a distance of one-eighth of an inch with relation to leaf 2 which, together with one-eighth inch movement between bearing structure 3 and leaf 1, would accommodate a one-fourth inch movement between leaves 1 and 2 and which one-fourth inch movement constitutes approximately the maximum relative movement between the end portions of the two longest leaves of a leaf spring of average length. Instead of making these holes one-eighth inch longer as above suggested it might be desired to make them but three-thirty-second inch or even one-sixteenth inch longer than the comparatively snug fit here illustrated as even such shorter lengths would permit a full floating action during maybe ninety percent of one's driving mileage. In the illustration, the usable length of the elongated hole 4 appears to be longer than the distance between the outer edges of the lower projections of member 5. This illusion however is due to the fact that hole 4 is provided with round ends. In other words the hole 4, in spite of its overall length is made to hold member 5 against any appreciable longitudinal movements within the hole. The rounded ends are preferred to straight ends as a safeguard against stress concentration and leaf breakage.

Referring to Fig. 3, numeral 1 indicates one of two adjacent leaves of a leaf spring, 2 indicates the other of said two leaves, 3 indicates a leaf-end friction bearing structure, 3a indicates a through hole provided in the friction bearing structure, 6 indicates an anchoring projection formed of the material of the spring leaf itself as for example by a punch operation following the roll tapering of the leaf end. The ends of these projections may be cut square, but, as in the remarks above relating to the end treatment of anchor member 5, I prefer that the corners at least be rounded if it is desired that the bearing structure be provided with a longer hole in order that the bearing structure be permitted to float between the leaves 1 and 2. 7 indicates a hole formed in leaf 2 as a result of punching the projection 6. If projections punched from the material of the spring leaf itself, such for example as here shown at 6—6, are employed in connection with leaves of center-groove section as here suggested by dotted line in leaf 1 Figs. 3 and 4 they may be made to the advantageous height as here shown because even at this height they cannot come into rubbing contact with leaf 1 even though the bearing structure is neglected to the point of becoming completely worn down. If, however, some such non-readily-renewable projections are desired to be employed in connection with leaves of S. A. E. flat section their initial height should be somewhat reduced in order to maintain smooth interleaf action and generous mileage service from the bearing structure before necessitating its renewal.

Referring to Fig. 5, numeral 1 indicates one of two adjacent leaves of a leaf spring, 2 indicates the other of said two leaves, 3 indicates a leaf-end friction bearing structure, 3a indicates a through hole provided in the friction bearing structure, 10—10 indicate two widely spaced preferably round stud-like anchor members resting directly against the upper surface of leaf 2 and positioned in holes provided adjacent an end of leaf 2. If this method of anchorage is used in connection with leaves of S. A. E. flat section a standard loose fit between the studs and the holes as indicated at X1 is preferred as the studs may be readily replaced by new ones in the event of their head portions having become scuffed and worn thin should the bearing structure have been permitted to wear excessively before having been replaced. If, however, this method of anchorage is used in connection with leaves of center-groove section the studs may be made fast with relation to the leaf as for example by a press fit as indicated at X2 should it be desired to place the studs in position in the holes at some stage prior to the point of final assembly of the leaves. This will result in the leaf assembly operator having but one part, the bearing structure, to handle instead of three parts. It will be clearly seen that these studs, when used in connection with grooved leaves can never be contacted by leaf 1 even though the bearing structure becomes completely worn through.

Referring again to Figures 1, 3 and 5, it will be noted that bearing structure 3 in Fig. 1 is equipped with two widely spaced through holes 3a for engagement with the end portions of anchor member 5. In this instance these two holes are preferred over the single elongated hole 3a shown in Fig. 3 in order that the bearing structure 3 shall be made to hold anchor member 5 firmly down against the surface of leaf 2. The anchoring projections 6 shown in Fig. 3 are in fixed position with relation to leaf 2 and hence do not require pressure from the bearing structure to hold them down and the single elongated hole 3a may be employed if desired. In short, it is optional in the case of all three figures, as might be dictated by manufacturing expediency, whether to employ two spaced holes or a single elongated hole in the bearing structure.

One of the particular objects of this invention as recited above is that the bearing structure be so designed as to present to at least one of two adjacent leaves of a leaf spring a surface of sufficient yieldability to readily conform, under the pressures imposed in service, to irregularities thereof and thus form an automatic seal against the entry of grit and abrasive laden waters. If the bearing structure 3 is anchored fast against longitudinal movements with relation to leaf 2, as here illustrated, thus causing all movements against the bearing structure to take place between it and leaf 1, this yieldability may be required only on the upper surface of the bearing structure. If, however, the bearing structure is provided with the longer holes, as referred to above, in order to take advantage of the floating action disclosed in my application, Serial No. 743,997, above referred to, then the above yieldability should be provided on both faces of the bearing structure.

When readily removable anchor members, such for example as shown in Fig. 1 and Fig. 5, X1, are employed in connection with leaves of S. A. E. flat section and where it is desired to permit the bearing structure to wear down to something like wafer thinness before replacing it, the anchor members may be made of some such readily wearable material as aluminum or hard rubber.

Numeral 3 in each of the figures above designates a leaf-end friction bearing structure of any suitable material and construction such for example as textile fabric impregnated with, and also coated with, suitable friction material, such for example as described in U. S. Patent 1,845,096, saturating paper similarly impregnated and coated, or other construction or composition presenting a yieldable and conformable surface to one or both of the spring leaves and exhibiting frictional properties whereof the static and dynamic coefficients of friction are sufficiently in balance to avoid setting up destructive spasmodic actions and/or objectionable noise-producing vibrations.

From the drawings it will readily be seen that the bearing structure in each instance is limited as to longitudinal, lateral and turning movements with relation to leaf 2 while in service. Also it will be seen that, upon the spreading of the leaves, these bearing structures are free for instant removal and replacement in kind.

Leaf springs are employed in many mechanisms and are variously mounted in horizontal, vertical or oblique position. When employed as a means for vehicle suspension, leaf springs are generally mounted in a horizontal position, as shown by the drawings herewith, wherein the eye or main leaf is above the other leaves of the spring assembly, or in an inverted, horizontal position wherein the eye or main leaf is below the other leaves of the spring assembly. The claims herewith are drawn specifically to read on a spring assembly when viewed in the horizontal position here shown, wherein the eye or main leaf is above the other leaves of the assembly and not necessarily as the spring may be mounted in service. In order to accurately weigh claims as to their readability on structures of the prior art, or to accurately weigh structures as to their infringement of patented claims, the structures in both instances, if a correct comparison is to be made, will have to be viewed in the same position as that shown by the drawings on which the claims are based. Particularly is this essential where the force of gravity would influence the wording of a claim.

Having here described my invention and referred to some of its uses or applications, I claim:

1. In combination, two adjacent leaves of a leaf spring and which leaves are of unequal length, a leaf-end friction bearing structure positioned majorly between said leaves and contacting both of them and presenting to the longer of said leaves a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shear-wise, to produce, by sliding surface friction, resistance to the reciprocating movements of said leaves from the inception thereof, and anchoring means for limiting longitudinal, lateral and turning movements of said bearing structure with relation to said leaves while in service, said entire anchoring means being positioned in the shorter of said leaves adjacent an end thereof and comprising an anchoring device in definite position adjacent said end of said shorter leaf and extending from the tension surface thereof and into meshed engagement with hole means provided in said bearing structure for the reception of said anchoring device, said anchoring device being supported against the force of gravity by said shorter leaf, and the nature of the structural engagement between said entire anchoring means and said bearing structure being such as to permit, upon the spreading of said leaves, the ready removal of said bearing structure for replacement purposes and without disturbing the positionment of said anchoring means with relation to said shorter leaf.

2. In combination, two adjacent leaves of a leaf spring and which leaves are of unequal length, a leaf-end friction bearing structure positioned majorly between said leaves and contacting both of them and presenting to the longer of said leaves a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shear-wise, to produce, by sliding surface friction, resistance to the reciprocating movements of said leaves from the inception thereof, and anchoring means for limiting longitudinal, lateral and turning movements of said bearing structure with relation to said leaves while in service, said entire anchoring means being positioned in the shorter of said leaves adjacent an end thereof and comprising an anchoring device formed from the material of said shorter leaf itself adjacent an end thereof and extending from the tension surface thereof and into meshed engagement with hole means provided in said bearing structure for the reception of said anchoring device, said anchoring device being supported against the force of gravity by said shorter leaf, and the nature of the structural engagement between said entire anchoring means and said bearing structure being such as to permit, upon the spreading of said leaves, the ready removal of said bearing structure for replacement purposes and without disturbing the positionment of said anchoring means with relation to said shorter leaf.

3. In combination, two adjacent leaves of a leaf spring and which leaves are of unequal length, a leaf-end friction bearing structure positioned majorly between said leaves and contacting both of them and presenting to the longer of said leaves a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shear-wise, to produce, by sliding surface friction, resistance to the reciprocating movements of said leaves from the inception thereof, and anchoring means for limiting longitudinal, lateral and turning movements of said bearing structure with relation to said leaves while in service, said entire anchoring means being positioned in the shorter of said leaves adjacent an end thereof and comprising an anchoring device integral with said shorter of said leaves adjacent an end thereof and extending from the tension surface thereof and into meshed engagement with hole means provided in said bearing structure for the reception of said anchoring device, said anchoring device being supported against the force of gravity by said shorter leaf, and the nature of the structural engagement between said entire anchoring means and said bearing structure being such as to permit, upon the spreading of said leaves, the ready removal of said bearing structure for replacement purposes and without disturbing the positionment of said anchoring means with relation to said shorter leaf.

4. In combination, two frictionally opposed and relatively reciprocating load-supporting bodies associated with the suspension mechanism of a vehicle and which bodies are positioned one above the other, a friction bearing structure positioned majorly between said bodies and contacting both of them and presenting to the upper of said bodies a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shear-wise, to produce, by sliding surface friction, resistance to the reciprocating movements of said bodies from the inception thereof, and anchoring means for limiting longitudinal, lateral and turning movements of said bearing structure with relation to said bodies while in service, said entire anchoring means being positioned in the lower of said bodies and comprising an anchoring device formed from the material of said lower body itself and extending above the friction surface of said lower body and into meshed engagement with said bearing structure, said anchoring device being supported against the force of gravity by said lower body, and the nature of the structural engagement between said entire anchoring means and said bearing structure being such as to permit, upon the spreading of said bodies, the ready removal of said bearing structure for replacement purposes and without disturbing the positionment of said anchoring means with relation to said lower body.

5. In combination, two adjacent leaves of a leaf spring and which leaves are of unequal length, a leaf-end friction bearing structure positioned majorly between said leaves and contacting both of them and presenting to the longer of said leaves a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shearwise, to produce, by sliding surface friction, resistance to the reciprocating movements of said leaves from the inception thereof, and anchoring means for limiting longitudinal, lateral and turning movements of said bearing structure with relation to said leaves while in service, said entire anchoring means being positioned in the shorter of said leaves adjacent an end thereof and comprising an anchoring device press-fitted in a hole provided in said shorter leaf adjacent an end thereof and extending from the tension surface of said shorter leaf and into meshed engagement with hole means provided in said bearing structure for the reception of said anchoring device, said anchoring device being supported against the force of gravity by said shorter leaf, and the nature of the structural engagement between said entire anchoring means and said bearing structure being such as to permit, upon the spreading of said leaves, the ready removal of said bearing structure for replacement purposes and without disturbing the positionment of said anchoring means with relation to said shorter leaf.

6. In combination, two adjacent leaves of a leaf spring and which leaves are of unequal length, a leaf-end friction bearing structure positioned majorly between said leaves and contacting both of them and presenting to the longer of said leaves a surface of sufficient yieldability to conform to irregularities thereof and frictional properties whereof the static and dynamic coefficients of friction are effectively equalized to avoid setting up destructive spasmodic actions and/or objectionable noise-producing vibrations, said bearing structure being of a rigidity, shear-wise, to produce, by sliding surface friction, resistance to the reciprocating movements of said leaves from the inception thereof, and anchoring means for limiting longitudinal, lateral and turning movements of said bearing structure with relation to said leaves while in service, said entire anchoring means being positioned in the shorter of said leaves adjacent an end thereof and comprising an anchoring device in meshed engagement with hole means provided in said shorter leaf adjacent an end thereof and in meshed engagement with hole means provided in said bearing structure for the reception of said anchoring device, said anchoring device being in contact with the tension surface of said shorter leaf and being held firmly against said tension surface by pressure directly exerted against said anchoring device by said bearing structure, said anchoring device being supported against the force of gravity by said shorter leaf, and the nature of the structural engagement between said entire anchoring means and said bearing structure being such as to permit, upon the spreading of said leaves, the ready removal of said bearing structure for replacement purposes and without disturbing the positionment of said anchoring means with relation to said shorter leaf.

References Cited in the file of this patent

UNITED STATES PATENTS

| | | |
|---|---|---|
| 2,028,299 | Swinton | Jan. 21, 1936 |
| 2,161,838 | Thompson | June 13, 1939 |
| 2,280,201 | Thompson | Apr. 21, 1942 |
| 2,319,172 | Watson et al. | May 11, 1943 |
| 2,355,801 | Hildebrand | Aug. 15, 1944 |
| 2,476,367 | Guernsey | July 19, 1949 |